Dec. 22, 1931.  A. H. LENT  1,837,558

FISHING TACKLE

Filed Oct. 27, 1926

INVENTOR
A. H. LENT
BY
Harry C. Schweda
ATTORNEY

Patented Dec. 22, 1931

1,837,558

UNITED STATES PATENT OFFICE

ALFRED H. LENT, OF CAPITOLA, CALIFORNIA

FISHING TACKLE

Application filed October 27, 1926. Serial No. 144,446.

The present invention relates to improvements in fishing tackle, and its particular object is to arrange the spoon in a fishing tackle in such a manner that the spoon may freely revolve around its support without causing the hook and bait to revolve with the same. A further object of the invention is to provide a flexible swivel for the support of the spoon which not only allows the spoon to revolve more freely but which also, thru its wiggling movement, gives a life-like appearance to the spoon. A further object of the invention is to provide a connecting element between the swivel and the hook that is particularly simple in construction and has certain features which prevent the same from buckling, even when acted on by a heavy pull and although made of light material.

Further objects and advantages of my invention will appear as the specification proceeds.

The preferred form of my invention is illustrated in the accompanying drawings, in which—

Figure 1:
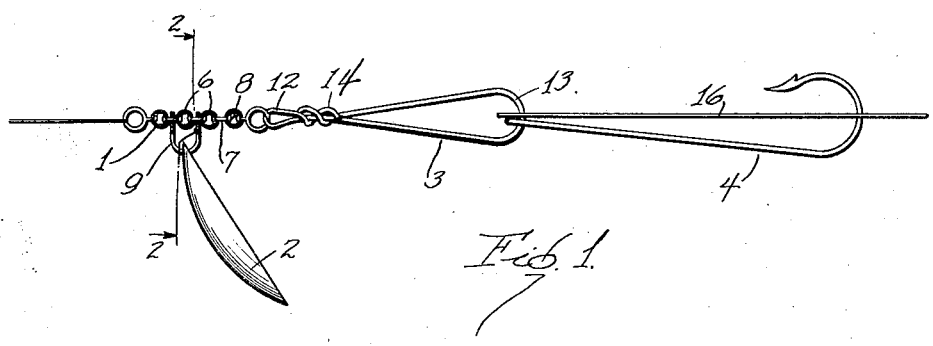
Figure 2:
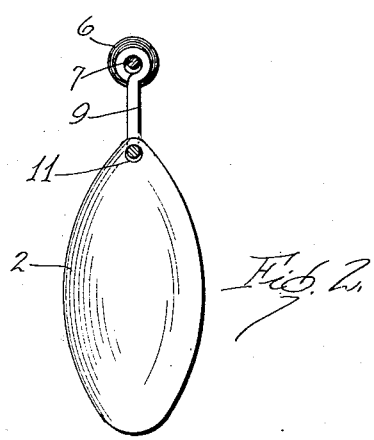

Figure 1 shows the fishing tackle in side view,

Figure 2 a section thru the swivel taken along line 2—2 of Figure 1, and

Figure 3:
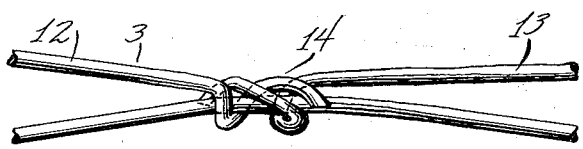

Figure 3 an enlarged detail view of the interlocking section of the connecting link.

While I have shown only the preferred form of the invention, I wish to have it understood that various changes or modifications may be made within the scope of the claims hereto attached without departing from the spirit of the invention.

In its preferred form, my fishing tackle comprises the swivel 1 having the spoon 2 secured relatively thereto, the link 3 and the hook 4.

The swivel 1 is made flexible by being formed of a plurality of balls 6 and links 7 interposed between the balls in such a manner that the balls freely swivel on the end of the links which latter are provided with small heads 8 inside the balls. A yoke 9, which is guided thru a perforation 11 in the spoon 2, has its end bent around two of the links 7 so that one ball is interposed between the two arms of the yoke. It will be noted that this method of fastening allows the yoke to freely swivel around the swivel without causing rotary motion of any part of the swivel itself and without affecting, more particularly, the last link of the flexible swivel.

The link 3 is made of a single piece of wire and has its end section turned over to form two loops 12 and 13, the extreme ends of the wire being wrapped upon an intermediate portion of the same in the manner shown at 14, the winding being arranged in parallel relation so that one holds the other against endwise motion. It will be seen that in this manner, while the wires may be comparatively easily released from the intermediate section by a certain twist, they will not slide along the intermediate section nor allow the strands of the loops to buckle when a heavy pull is exercised at the rear end thereof.

The hook 4 is fastened to the larger one of the loops and the bait 16, which is shown as a slice of bacon, may be fastened to the link and the hook in the manner shown in the drawing.

It will be seen that my fishing tackle offers several advantages. It allows the spoon to freely swivel around the chain or swivel without affecting the connecting link or the hook. The swivel being flexible in the form of a ball chain will drag thru the water in lifelike movement and will impart its characteristics to the movement of the spoon. The easy flexibility of the ball chain allows the links to always return to a normal position no matter how they have been twisted and turned in use, so that there is never any danger of the spoon becoming locked in a certain position due to a bending of a rigid swivel which might interfere with the speed and easy revolving movement of the spoon. The connecting link offers the advantage that one wrapped end of the wire interlocks with the other wrapped end, and thereby prevents buckling because one end holds the other end against sliding motion on the intermediate portion of the wire. The loop may be easily opened by untwisting the wire for the purpose of attaching the bacon in the manner shown in the drawing.

I claim:

1. A wire link provided with a formed eye engaging one of the end pin eyes of a swivel connector, said link being provided with a return bend for attachment of a fish hook and bait and continuing toward said eye, terminating in a substantially complete circle helix to cooperate with a similar helix formed on the eye member and disposed about the main member thereof.

2. A bait and hook link comprising a single length of resilient wire formed into a loop at each end, the terminals of said wire being formed into spirals, one of said spirals being fixedly engaged about the intermediate portion between the loops, the other of said spirals being in detachable engagement with said one spiral.

3. A bait and hook link, comprising a single length of resilient wire formed with oppositely disposed elongated loops with the terminals thereof formed into open spirals, one of said spirals being fixedly engaged about the intermediate portion between the loops, the other of said spirals being in detachable engagement with said one spiral whereby two closed interlocked loops are formed.

4. A bait and hook link comprising a pair of integral, oppositely disposed elongated loops, formed from a single length of resilient wire with convoluted terminals, one of said terminals fixedly engaging the intermediate portion of the wire, the other terminal being in detachable interlocking relation with said one terminal.

In testimony whereof I affix my signature.

ALFRED H. LENT.